United States Patent
Chung et al.

(10) Patent No.: US 9,370,991 B2
(45) Date of Patent: Jun. 21, 2016

(54) HYBRID POWERTRAIN FOR VEHICLE

(71) Applicant: HYUNDAI MOTOR COMPANY, Seoul (KR)

(72) Inventors: Eui Cheol Chung, Seoul (KR); Wan Soo Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/526,276

(22) Filed: Oct. 28, 2014

(65) Prior Publication Data

US 2015/0360552 A1 Dec. 17, 2015

(30) Foreign Application Priority Data

Jun. 16, 2014 (KR) ........................ 10-2014-0072874

(51) Int. Cl.
 *F16H 3/72* (2006.01)
 *B60K 6/38* (2007.10)
 *B60K 6/445* (2007.10)

(52) U.S. Cl.
 CPC . *B60K 6/38* (2013.01); *B60K 6/445* (2013.01); *Y10S 903/912* (2013.01); *Y10T 477/26* (2015.01)

(58) Field of Classification Search
 None
 See application file for complete search history.

(56) References Cited

U.S. PATENT DOCUMENTS

| | | | | |
|---|---|---|---|---|
| 6,712,734 B1 * | 3/2004 | Loeffler | .............................. | 477/5 |
| 7,150,698 B2 * | 12/2006 | Sakamoto et al. | ................. | 477/5 |
| 8,262,524 B2 * | 9/2012 | Rask et al. | ......................... | 475/5 |
| 8,414,440 B2 * | 4/2013 | Tiwari et al. | ................... | 475/151 |
| 9,114,699 B2 * | 8/2015 | Takei et al. | | |
| 2012/0028757 A1 | 2/2012 | Kimura et al. | | |
| 2015/0107407 A1 * | 4/2015 | Park et al. | ........................ | 74/661 |

FOREIGN PATENT DOCUMENTS

| | | |
|---|---|---|
| JP | 2005-001564 A | 1/2005 |
| KR | 10-2012-0118925 A | 10/2012 |
| KR | 10-2013-0058993 A | 6/2013 |

OTHER PUBLICATIONS

Korean Office Action dated Jul. 8, 2015 issued in Korean Patent Application No. 10-2014-0072874.

* cited by examiner

*Primary Examiner* — Dirk Wright
(74) *Attorney, Agent, or Firm* — McDermott Will & Emery LLP

(57) ABSTRACT

A hybrid powertrain for a vehicle includes an input shaft rotating in response to a power received from an engine. output shaft is arranged parallel to the input shaft. A first motor generator is configured to transmit and receive a power to and from the output shaft. A second motor generator is configured to transmit and receive a power to and from the input shaft. A first clutch structure enables or disables transmission of the power between the first motor generator and the output shaft. A second clutch structure enables or disables transmission of the power between the input shaft and the output shaft. A third clutch structure enables or disables transmission of the power between the second motor generator and the input shaft.

8 Claims, 3 Drawing Sheets

HYBRID POWERTRAIN FOR VEHICLE

CROSS REFERENCE TO RELATED APPLICATION

The present application claims the benefit of priority to Korean Patent Application Number 10-2014-0072874 filed on Jun. 16, 2014, the entire contents of which application are incorporated herein for all purposes by this reference.

TECHNICAL FIELD

The present disclosure relates, in general, to a hybrid powertrain for a vehicle, and more particularly, to a powertrain structure configured to provide a vehicle with driving power as required from an engine and a motor.

BACKGROUND

Among hybrid vehicles, a plug-in hybrid vehicle uses a battery having a greater capacity than that of typical hybrid vehicles. When a driver drives for a short distance, the plug-in hybrid vehicle can operate in an electric vehicle (EV) mode only using a motor, thereby reducing the use of fossil fuel.

In addition, when the battery is exhausted while traveling for a long distance or through a crowded downtown area, the battery is charged by means of an engine or the vehicle can be propelled by the engine.

In order to maximize the performance of the plug-in hybrid vehicle, it is required to obtain optimum driving efficiency in both EV mode in which only the motor operates and engine mode in which only the engine operates.

The information disclosed in the Background is only for the enhancement of understanding of the background of the invention, and should not be taken as an acknowledgment or as any form of suggestion that this information forms a prior art that would already be known to a person skilled in the art.

SUMMARY

The present disclosure has been made keeping in mind the above problems occurring in the related art. The present disclosure is intended to propose a hybrid powertrain for a vehicle which can achieve optimum driving efficiency in each mode of operation, that is, in both electric vehicle (EV) mode in which a hybrid vehicle is propelled only by a motor and engine mode in which the vehicle is propelled only by an engine in order to maximize the driving efficiency of the vehicle, thereby improving fuel efficiency and increasing a distance that the vehicle can travel.

According to one aspect of the present inventive concept, a hybrid powertrain for a vehicle that includes an input shaft rotating in response to a power received from an engine. An output shaft is arranged parallel to the input shaft. A first motor generator is configured to transmit and receive a power to and from the output shaft. A second motor generator is configured to transmit and receive a power to and from the input shaft. A first clutch structure enables or disables transmission of power between the first motor generator and the output shaft. A second clutch structure enables or disables transmission of power between the input shaft and the output shaft. A third clutch structure enables or disables transmission of power between the second motor generator and the input shaft.

According to the present disclosure as set forth above, it is possible to achieve the optimum driving efficiency in both EV mode in which a hybrid vehicle is propelled only by a motor and engine mode in which the vehicle is propelled only by an engine in order to maximize the driving efficiency of the vehicle, thereby improving fuel efficiency and increasing a distance that the vehicle can travel.

BRIEF DESCRIPTION OF THE DRAWINGS

The above and other objects, features and advantages of the present disclosure will be more clearly understood from the following detailed description when taken in conjunction with the accompanying drawings.

DETAILED DESCRIPTION

Figure 1:
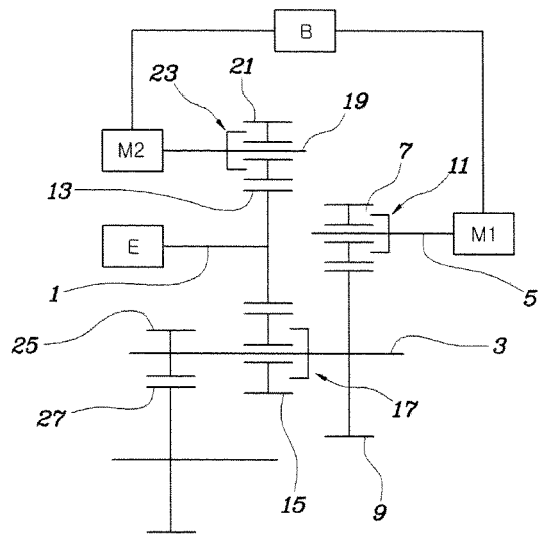
FIG. 1 is a view illustrating a structure of a hybrid powertrain for a vehicle according to an exemplary embodiment of the inventive concept.

Reference will now be made in greater detail to an exemplary embodiment of the present inventive concept, an example of which is illustrated in the accompanying drawings. Wherever possible, the same reference numerals will be used throughout the drawings and the description to refer to the same or like parts.

Referring to FIG. 1, a hybrid powertrain for a vehicle according to an exemplary embodiment of the inventive concept includes an input shaft 1, an output shaft 3, first and second motor generators M1 and M2, and first to third clutch structures (not shown in the drawings). The input shaft 1 is configured to rotate in response to power received from an engine E. The output shaft 3 is arranged parallel to the input shaft 1. The first motor generator M1 is configured to transmit and receive power to and from the output shaft 3. The second motor generator M2 is configured to transmit and receive power to and from the input shaft 1. The first clutch structure can enable and disable the transmission of power between the first motor generator M1 and the output shaft 3. The second clutch structure can enable and disable the transmission of power between the input shaft 1 and the output shaft 3. The third clutch structure can enable and disable the transmission of power between the second motor generator M2 and the input shaft 1.

The first motor generator M1 is configured to drive a first motor shaft 5 which is separate from the input shaft 1. The first motor shaft 5 cooperates with the output shaft 3 to transmit power along a separate power transmission path independent from a path along which the power is transmitted from the input shaft 1 to the output shaft 3.

According to this embodiment, the engine E and the first motor generator M1 are disposed independently from each other. With this configuration, when only one of the engine E and the first motor generator M1 operates, the other one of the engine E and the first motor generator M1 can be subjected to no load. Accordingly, in an electric vehicle (EV) mode in which only the first motor generator M1 operates, it is possible to prevent the engine from consuming power. In the engine mode in which only the engine operates, it is possible to prevent power from being lost due to the inertia of the first motor generator M1. This can consequently optimize the driving efficiency in each driving mode, thereby improving fuel efficiency and increasing a distance that a vehicle can travel.

The first motor shaft 5 is provided with a first free gear 7 which is freely rotatable. The output shaft 3 is provided with a first restraint gear 9 which is restrained from rotating M and is meshed with the first free gear 7. The first clutch structure is implemented as a first synchronous device 11 which connects or disconnects the first free gear 7 to or from the first motor shaft 5.

The input shaft 1 includes a drive gear 13 which cooperates with the output shaft 3 and the second motor generator M2 to transmit power. A second free gear 15 is disposed on the output shaft 3 such that the second free gear 15 is freely rotatable. The second free gear 15 is meshed with the drive gear 13. The second clutch structure is implemented as a second synchronous device 17 which connects or disconnects the second free gear 15 to or from the output shaft 3.

The second motor generator M2 is configured to drive a second motor shaft 19. The second motor shaft 19 is provided with a third free gear 21 which is freely rotatable. The third clutch structure is implemented as a third synchronous device 23 which connects or disconnects the third free gear 21 to or from the second motor shaft 19.

According to this configuration, although the power of the engine E can be continuously supplied to the second free gear 15 on the output shaft 3 and the third free gear 21 on the second motor shaft 19, the transmission of power from the engine E to the output shaft 3 and the transmission of power from the engine E to the second motor generator M2 are selectively variable depending on the operating state of the second synchronous device 17 and the operating state of the third synchronous device 23. Accordingly, in the state in which it is not required to charge a battery B, it is possible to release the third synchronous device 23, thereby preventing the inertia of the second motor generator M2 from acting as a load on the engine.

According to this embodiment, the output shaft 3 is provided with an output gear 25, which is configured to output power to a differential ring gear 27. Each of the first to third clutch structure may be implemented as a wet clutch or the like instead of the above-mentioned synchronous device.

With reference to FIGS. 2 to 5, a description will be given below of the operating modes of the powertrain according to an exemplary embodiment of the inventive concept as described above.

Figure 2:
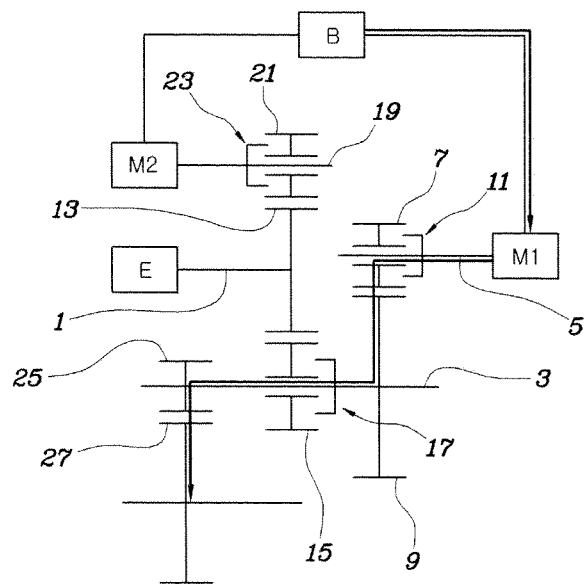
FIG. 2 is a view illustrating the state in which the powertrain shown in FIG. 1 is converted into an electric vehicle (EV) mode.

FIG. 2 illustrates the state in which an EV mode is realized. In this state, the first synchronous device 11 is in a power-transmitting state such that the power of the first motor generator M1 is transmitted to the first restraint gear 9 through the first free gear 7, whereby the power is output to the output shaft 3.

At this time, the second synchronous device 17 is released from the power-transmitting state, and when the engine E stops, the engine E does not consume the power provided from the first motor generator M1, whereby the vehicle can operate at the optimum fuel efficiency.

Figure 3:
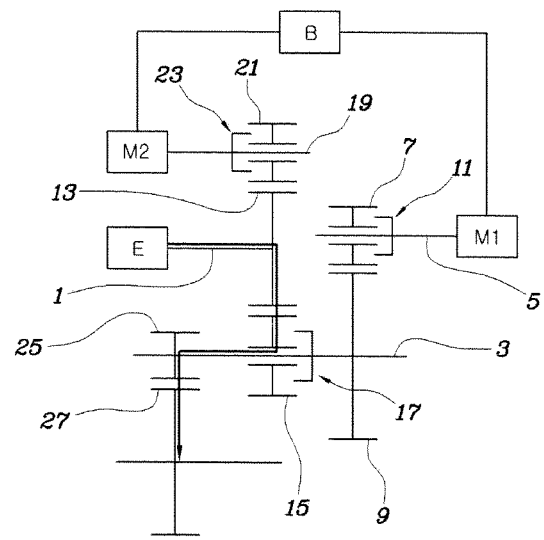
FIG. 3 is a view illustrating the state in which the powertrain shown in FIG. 1 is converted into an engine operating mode.

FIG. 3 illustrates an engine mode, in which driving power for a vehicle is provided only by an engine. The second synchronous device 17 is in a power-transmitting state such that the power of the engine E is transmitted to the output shaft 3. At the same time, the first synchronous device 11 and the third synchronous device 23 are released from the power-transmitting state such that neither the inertia of the first motor generator M1 nor the inertia of the second motor generator M2 acts as a load on the engine E.

Accordingly, in this state, the vehicle can operate at the optimum efficiency.

Of course, when more power in addition to the power of the engine is required as in a case in which rapid acceleration or driving uphill is required, it is possible to convert the first synchronous device 11 into the power-transmitting state such that the first motor generator M1 can aid the power of the engine E. In addition, it is possible to realize a parallel hybrid electric vehicle (HEV) mode by converting the third synchronous device 23 into power-transmitting state in which the second motor generator M2 also aids the power of the engine.

Figure 4:
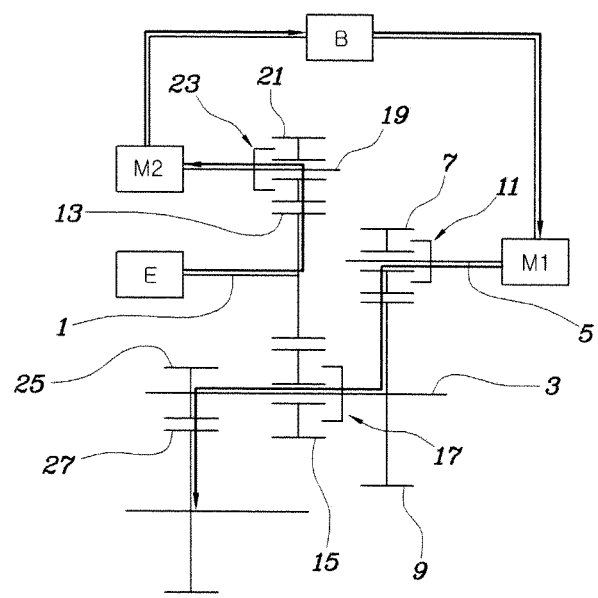
FIG. 4 is a view illustrating the state in which the powertrain shown in FIG. 1 is converted into an hybrid electric vehicle (HEV) mode.

FIG. 4 illustrates an HEV mode in which a series HEV mode different from a parallel HEV mode is realized.

Specifically, the second synchronous device 17 is released from the power-transmitting state such that the power of the M engine is used only in generating power by driving the second motor generator M2 via the third synchronous device 23. The first motor generator M1 is driven using electric power that has been generated in this manner. In this state, the vehicle is propelled only by the driving power generated from the first motor generator M1.

Figure 5:
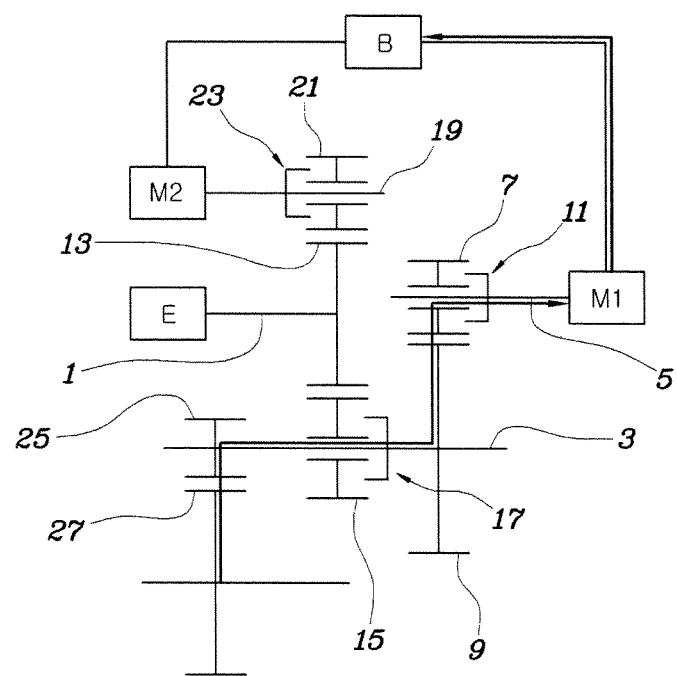
FIG. 5 is a view illustrating the state in which the powertrain shown in FIG. 1 is in a regenerative braking mode.

FIG. 5 illustrates the case in which the powertrain according to an exemplary embodiment of the present inventive concept realizes a regenerative braking function.

The first synchronous device 11 is converted into the power-transmitting state, whereas the second synchronous device 17 is released from the power-transmitting state. The first motor generator M1 generates electricity using power fed back from driving wheels, thereby charging the battery B.

Although the exemplary embodiments of the present inventive concept have been described for illustrative purposes, those skilled in the art will appreciate that various modifications, additions and substitutions are possible, without departing from the scope and spirit of the present invention as disclosed in the accompanying claims.

What is claimed is:

1. A hybrid powertrain for a vehicle comprising:
    an input shaft rotating in response to a power received from an engine;
    an output shaft arranged parallel to the input shaft;
    a first motor generator configured to transmit and receive a power to and from the output shaft;
    a second motor generator configured to transmit and receive a power to and from the input shaft;
    a first clutch structure for enabling or disabling transmission of the power between the first motor generator and the output shaft;
    a second clutch structure for enabling or disabling transmission of the power between the input shaft and the output shaft; and
    a third clutch structure for enabling or disabling transmission of the power between the second motor generator and the input shaft,
    wherein the first motor generator is configured to drive a first motor shaft separate from the input shaft, the first motor shaft cooperating with the output shaft to transmit the power along a separate power transmission path independent from a path along which the power is transmitted from the input shaft to the output shaft.

2. The hybrid powertrain according to claim 1, wherein
    the first motor shaft comprises a first free gear which is freely rotatable,
    the output shaft comprises a first restraint gear which is restrained from rotating and is meshed with the first free gear, and the first clutch structure comprises a first synchronous device which connects or disconnects the first free gear to or from the first motor shaft.

3. The hybrid powertrain according to claim 2, wherein
the input shaft comprises a drive gear which cooperates with the output shaft and the second motor generator to transmit the power,
the output shaft comprises a second free gear which is disposed freely rotatable on the output shaft, the second free gear being meshed with the drive gear, and
the second clutch structure comprises a second synchronous device which connects or disconnects the second free gear to or from the output shaft.

4. The hybrid powertrain according to claim 3, wherein
the second motor generator drives a second motor shaft,
the second motor shaft comprises a third free gear which is freely rotatable, and
the third clutch structure comprises a third synchronous device which connects or disconnects the third free gear to or from the second motor shaft.

5. The hybrid powertrain according to claim 2, wherein the first clutch structure is implemented as the first synchronous device.

6. The hybrid powertrain according to claim 3, wherein the second clutch structure is implemented as the second synchronous device.

7. The hybrid powertrain according to claim 4, wherein the third clutch structure is implemented as the third synchronous device.

8. The hybrid powertrain according to claim 1, wherein the output shaft is provided with an output gear which is configured to output the power to a differential ring gear.

* * * * *